E. KATZINGER.
BAKING PAN.
APPLICATION FILED FEB. 8, 1915.

1,200,849.  Patented Oct. 10, 1916.

Witnesses:
R. C. Farrington
Leo J. DeFrais

Inventor
Edward Katzinger
By Brown Nissen & Sprinkle
Attys.

UNITED STATES PATENT OFFICE.

EDWARD KATZINGER, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,200,849.  Specification of Letters Patent.  Patented Oct. 10, 1916.

Application filed February 8, 1915. Serial No. 6,877.

*To all whom it may concern:*

Be it known that I, EDWARD KATZINGER, a citizen of the United States, residing at Chicago, in the county of Cook and State of Illinois, have invented certain new and useful Improvements in Baking-Pans, of which the following is a specification.

My invention relates to baking pan constructions and has for its object the provision of means for maintaining the upper adjacent edges or rims of the pans in a connected series of baking pans rigidly in fixed relations.

A further object is the provision of a simple, strong and efficient baking pan construction.

Other objects will appear hereinafter.

The invention consists in substantially the combinations and arrangement of parts hereinafter described, shown in the accompanying drawing forming a part of this specification and more specifically set forth in the appended claims.

Figure 1:
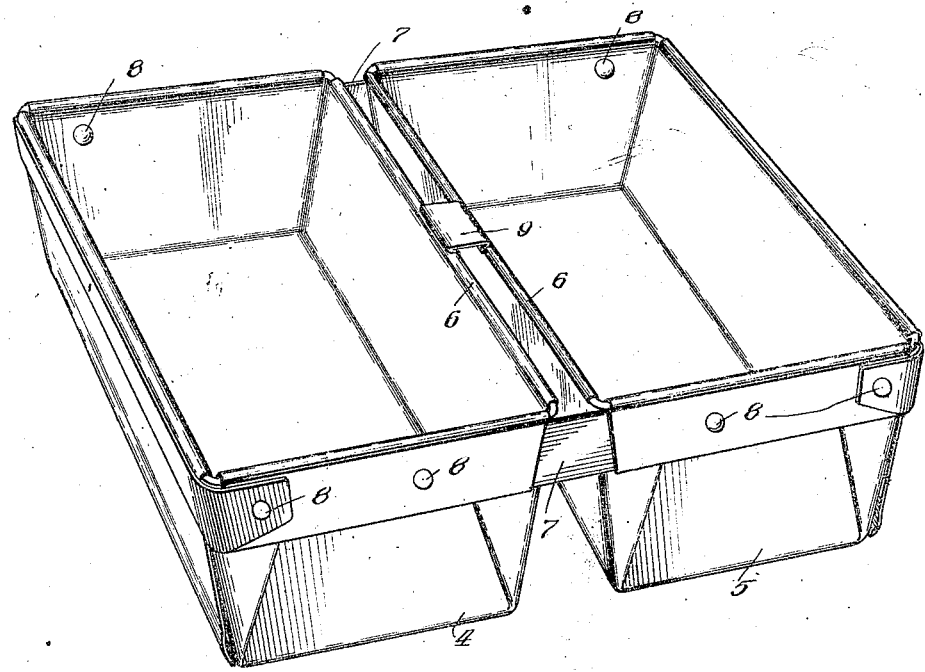
Figure 2:
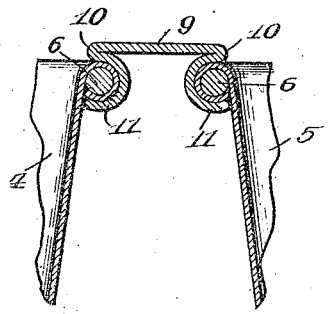
Figure 3:
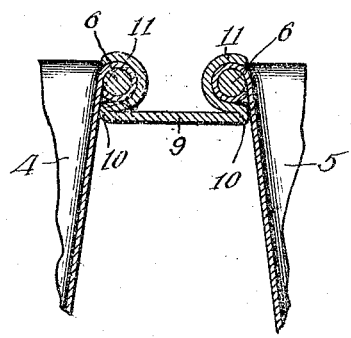

In the drawing Figure 1 is a perspective view of a connected series of baking pans equipped with my invention. Fig. 2 is an enlarged section taken through the spacing member and portions of the pan; and Fig. 3 is a similar view showing the spacing member applied in a slightly different manner.

In baking pan constructions, it is the usual custom to secure a number of pans in a connected series in order to enable the operator to handle a number of pans more quickly and conveniently. In securing the baking pans together, it is necessary to space them slightly apart in order to permit heat to pass between the pans to insure even baking of material in the pans. In use, the adjacent portions of the rims of the pans often get bent, either toward or away from each other, causing the loaves of material to be of unequal sizes, and sometimes interfering with the circulation of heat between the pans in the baking process.

My invention consists in providing one or more spacing members for the adjacent upper edges or rims of the pans in order to maintain such rims in fixed relations.

In the drawing, I have shown two pans 4 and 5 having straps 7 disposed across their ends and connected thereto by means of rivets 8. I have shown only two connected pans, but it is to be understood that my invention is equally applicable to a connected series of any desired number of individual pans.

The form of the pans and the means for connecting their end portions may be varied to suit particular requirements or in any desirable manner.

My invention consists in providing and securing the member 9 in such a manner that it will rigidly space the adjacent edges or rim portions 6 of pans 4 and 5 to prevent them from being moved toward or away from each other. The provision of this means insures that a fixed space between the pans will always be maintained. In making pans in comparatively long lengths, it is often desirable to place a number of the members 9 between adjacent edges of the pans in order to maintain the latter in fixed relation throughout their lengths. When a number of members 9 are used, these members are alike in construction and the manner in which they operate, so that by showing the application of one of these members, it will be evident to one skilled in the art how any number may be used as desired and to suit different requirements.

The member 9 is preferably a piece of sheet metal rebent as at 10 near its ends, with the end portions 11 following around and clamping the wired rims or edges 6 of the pans 4 and 5. By the term "rebent" I mean that the end portions 11 are bent back upon the central portion of member 9 for a short distance before diverging therefrom to pass around the rims 6. The end portions 11 each follow around one of the wired rims 6 a distance greater than one half the distance around said rim in order to clamp said end portion on said rim and prevent removal thereof. From this construction then, it will be seen that the end portions 11 are rigidly secured to the rims 6 and even though the pans receive rough usage, their adjacent edge portions 6 will always be maintained in fixed relation. The members 9 may be made of any suitable material and are preferably of a sheet metal construction heavier than the metal of the pans and of sufficient rigidity to prevent the removal of the end portions 11 from the rims 6.

While I have illustrated and described the preferred form of construction of my invention, I do not desire to be limited to the precise details set forth, but desire to avail myself of such variations and changes as come within the scope of the appended claims.

What I claim is:

1. An article of manufacture consisting of a pan brace narrow in width and having each end portion bent back upon the central portion thereof, curved and extending through more than a half circle, said curved end portions being adapted to be clamped on the edges of adjacent rims of intersticed pans intermediate the ends of the latter for holding the pan rims in spaced relation without materially closing the space between the pans.

2. A pan brace comprising a narrow stiff piece of metal having its end portions bent back upon its central portion with said end portions curved through more than half circles and disposed with their concave surfaces facing away from each other forming jaws for holding intersticed pan rims against movement toward and away from each other, without materially closing the space between such pan rims.

In testimony whereof I have signed my name to this specification, in the presence of two subscribing witnesses, on this 6th day of February A. D. 1915.

EDWARD KATZINGER.

Witnesses:
THOMAS COLSON,
ARTHUR L. SPRINKLE.